Feb. 6, 1940.                D. HEYER                2,189,288
CENTRIFUGALLY CONTROLLED VARIABLE SPEED TRANSMISSION
Filed Aug. 30, 1932    3 Sheets-Sheet 1
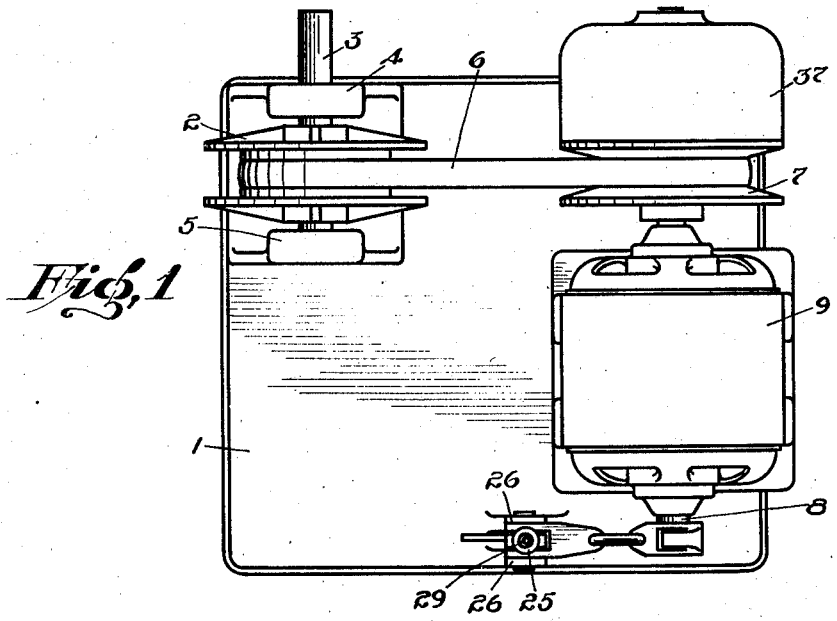
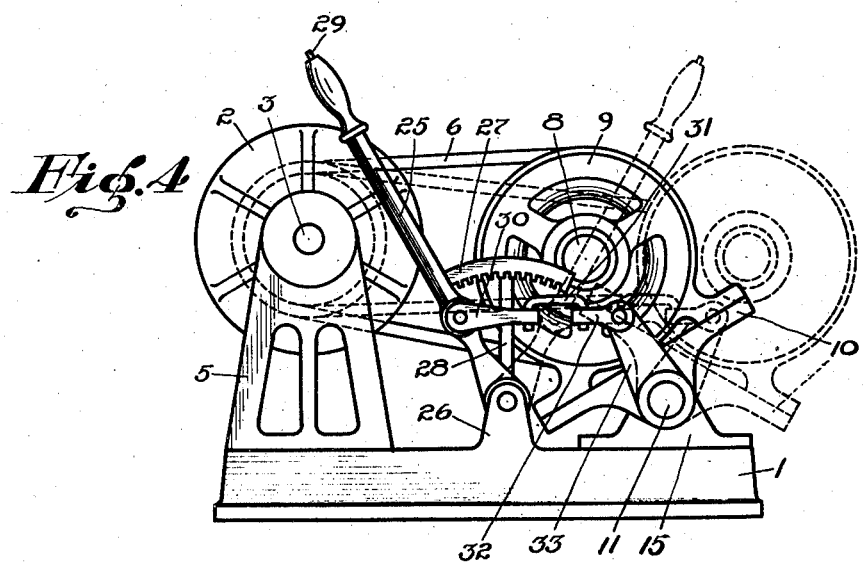
Inventor
Don Heyer
by John Flam
Attorney Feb. 6, 1940.   D. HEYER   2,189,288
CENTRIFUGALLY CONTROLLED VARIABLE SPEED TRANSMISSION
Filed Aug. 30, 1932   3 Sheets-Sheet 2

Inventor
Don Heyer
by John Flam
Attorney

Patented Feb. 6, 1940

2,189,288

UNITED STATES PATENT OFFICE 2,189,288

CENTRIFUGALLY CONTROLLED VARIABLE SPEED TRANSMISSION

Don Heyer, Los Angeles, Calif., assignor to U. S. Electrical Motors, Inc., a corporation of California Application August 30, 1932, Serial No. 631,067

26 Claims. (Cl. 74—230.17)

This invention relates to variable speed transmissions. More particularly it relates to a transmission in which there are two pulley structures connected by an endless belt, preferably of V form, and in which one or both pulley structures have adjustable effective pulley diameters.

This adjustment of pulley diameter is effected by making the pulley in two sections adjustable axially with respect to each other, the sections having opposed inclined faces.

In the particular device to be described hereafter, the adjustment of pulley diameter is effected by varying the distance between the axes of the driven and the driving pulleys, the two sections of the adjustable pulley structure being resiliently urged toward one another, and automatically adjusted to comply with the particular axial spacing chosen.

It is one of the objects of this invention to provide a novel and simple form of the device that resiliently urges the pulley sections together. In furtherance of this object, there is utilized a centrifugally actuated mechanism, the centrifugal force acting as the resilient force for this purpose. An important advantage of this arrangement is the inherent practicality of so designing the mechanism that the yielding force can be designed to vary in accordance with the pulley diameter.

The importance of this effect can be best appreciated by a discussion of the action of the transmission mechanism. If the variable diameter pulley is on the shaft which is the driving shaft, the pulley sections should be urged together more strongly when the diameter is small, because the belt surface on which the pulley acts is less, and accordingly there is greater tendency to slip unless the pulley sections are urged strongly against the side of the belt. By the aid of this invention, this effect can be readily accomplished.

It is also apparent that if the pulley sections are so arranged that one is fixed against axial movement, and the other is urged axially toward it, the belt is moved axially toward said fixed section as the diameter is increased. It is another object of this invention to provide a simple and effective mechanism whereby the belt is left in alinement to coact properly with the driven pulley. This is accomplished by pivotally mounting the driving pulley and its source of power (such as an electric motor) on an axis parallel to the shafts, and by providing that this entire assembly of pulley and source of motion is automatically moved in accordance with the angular motion, to keep the belt in alinement.

When using centrifugal force to urge the adjustable pulley sections together, of course no force is available to do this when the mechanism is started from standstill. In order to ensure that the belt will nevertheless grip the pulley, there is provided a locking means holding the pulley sections at any setting, during standstill and during the starting period. It is accordingly another object of my invention to provide an automatically releasable locking means of this character, which operates to free the pulley sections as soon as speed is attained, and to place them under the control of the centrifugal device.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Figure 1 is a top plan view of a variable speed transmission device, including the source of power, which incorporates my invention;

Fig. 4 is a view similar to Fig. 3, but showing the mode of adjusting the transmission for varying speed ratios;

The system in general incorporates a base 1 upon which the active parts of the system are supported. Thus there is a driven pulley 2, shown in this instance as of invariable diameter, mounted on a shaft 3, which is adapted to be connected to any appropriate load. The shaft 3 is journalled in appropriate bearing standards, such as 4 and 5.

Pulley 2 has protecting guard flanges extending for a considerable distance beyond its active face. These flanges help materially to keep the belt 6 from jumping off the pulley when the ratio of transmission is being adjusted.

Figure 5:
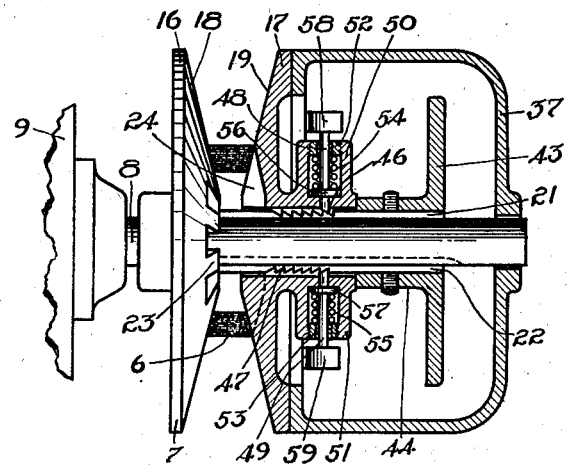
Fig. 5 is a sectional view taken along plane 5—5 of Fig. 2.

Pulley 2 has a V-groove in its face accommodating an endless V-belt 6, the section of which is most clearly shown in Fig. 5. This belt is engaged by a driving pulley structure indicated by the reference character 7 in Fig. 1 and shown in greater detail in Fig. 5. This pulley structure has an adjustable effective diameter whereby the ratio of transmission from pulley 7 to pulley 2 may be adjusted. The manner in which the pulley diameter adjustment is secured will be detailed hereinafter. It is sufficient for the present to note that the pulley structure 7 is mounted on a shaft 8, which is driven by a source of power such as the electric motor 9. This electric motor is provided with a base 10 which is pivotally supported on an axis parallel to the axis of shaft 8. For example, this pivotal structure can include a shaft 11 (Fig. 2) engaging in the ears 12 and 13 depending from base 10. These ears are rigidly fixed on shaft 11, as by set screws 14. This shaft, furthermore, is journalled between the ears 12 and 13 in a wide standard 15.

It is apparent that angular motion of base 10 about the axis of shaft 11 will serve to vary the axial space of driven shaft 3 and driving shaft 8. The limits of this angular adjustment is indicated in Fig. 4, the minimum spacing between shafts being shown in full lines and the maximum spacing in dash lines.

This angular motion also automatically causes the adjustable pulley structure 7 to vary its diameter in accordance with the variation in the axial spacing.

Figure 2:
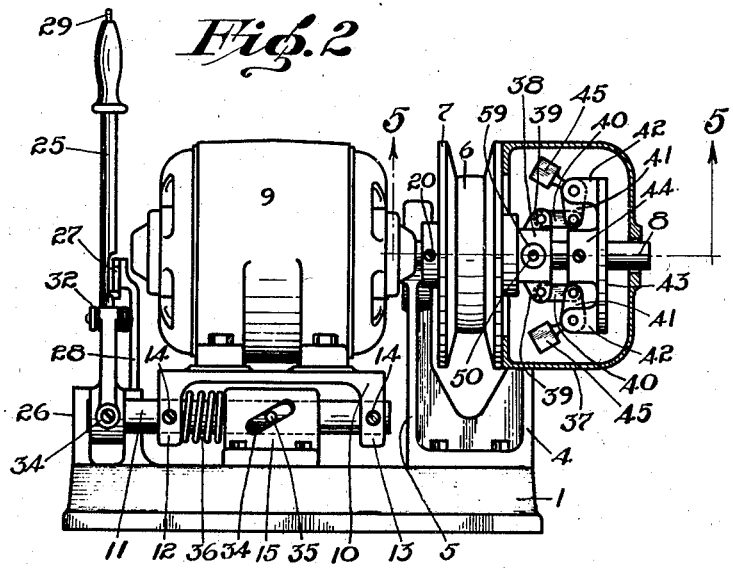
Fig. 2 is a side elevation thereof, the cover for the centrifugal controlling device being in section to illustrate this mechanism more clearly.

The adjustable pulley structure 7, as shown most clearly in Fig. 5, includes relatively axially adjustable pulley sections 16 and 17, having opposed inclined faces 18 and 19 forming, by relative axial adjustment, variable effective pulley diameters. In the present instance section 16 is fixed against axial movement on shaft 8 as by the aid of a set screw 20 passing through the hub of section 16 (Fig. 2). The other section, 17, however, is splined for axial adjustment, on one or more fixed keys 21, 22. These keys extend through keyways in the adjustable section 17. As is well known in the art, the sections 16 and 17 may have interengaging projections such as 23 and 24 for making it possible to move the sections 16 and 17 together close enough to secure a large maximum effective diameter.

The section 17 is urged by a resilient or yielding force toward section 16 when the apparatus is in operation. It is apparent that this axial adjustment will cause the longitudinal center of belt 6 to move in an axial direction, as this belt moves up and down on the inclined face 18, which is axially fixed with respect to shaft 8. To compensate for this variation in belt position with respect to pulley section 16, the arrangement is such that the entire pulley assembly including motor 9 is moved axially with respect to the supporting standard 15, in response to the pivotal adjustment of the motor base 10 in this standard. The mechanism whereby this is accomplished will now be described.

The angular adjustment of shaft 11 is provided by hand lever 25 pivoted by the aid of ears 26 on the base 1. The angular position of this hand lever 25 can be fixed by the aid of a conventional type of segment 27 supported on an upright standard 28 from the base 1. This standard is shown most clearly in Fig. 2. The grip of hand lever 25 can be provided with a push button 29 which must be depressed to free the lever from the segment 27, but which is returned in a well understood way by spring pressure to hold lever 25 fixed with respect to segment 27. Since this type of adjustable hand lever mechanism is old and well known, further description thereof is unnecessary.

The angular adjustment of lever 25 is translated into an angular adjustment of shaft 11. This is accomplished by the aid of a link 30, pivoted at an intermediate point on the hand lever 25. Another link 31 is provided, which is pivoted to link 30 on an axis transverse to the axis of link 30 on lever 25. Link 31 is similarly pivoted to a third link 32, pivoted in turn to an arm 33 which is fixed as by screw 34 to the shaft 11. Due to the provision of the link 31 it is apparent that a universal joint is provided by the link 30 and link 32, whereby it is possible to move shaft 11 with its arm 33 in an axial direction without disturbing the link connections.

Figure 3:
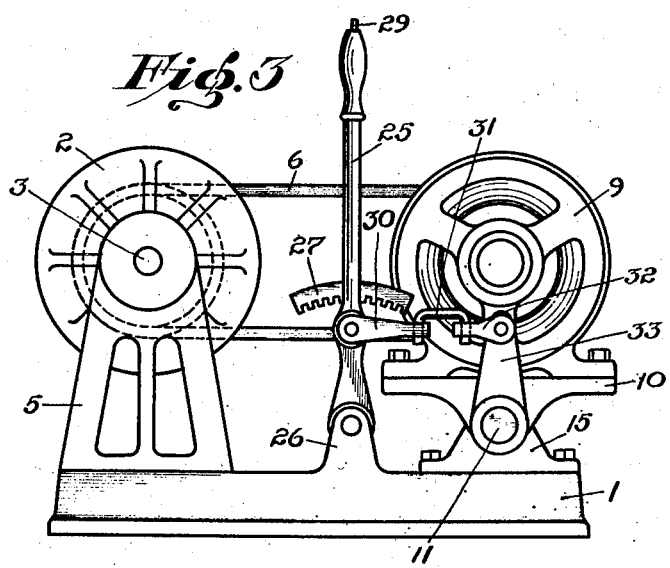
Fig. 3 is a front elevation thereof.
Figure 6:
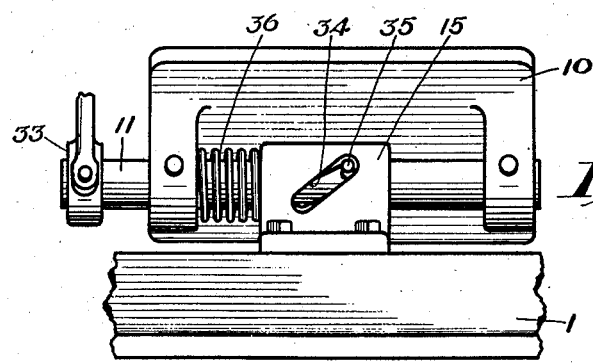
Figs. 6 and 7 are fragmentary detail views illustrating the mechanism for keeping the belt in alinement.
Figure 7:
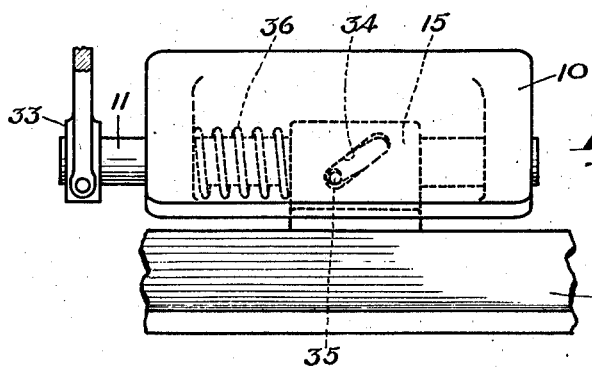

Automatic axial adjustment of shaft 11, which carries motor base 10, is accomplished by a slot and pin connection between the shaft 11 and standard 15. Thus standard 15 can be provided with a sloping slot 34 (Figs. 2, 6 and 7). In this slot is engaged a pin 35 fixed to and extending radially from shaft 11. When shaft 11 is rotated in a clockwise direction as viewed in Figs. 3 and 4, the effective diameter of pulley structure 7 is decreased, due to the increase in the axial spacing between shafts 3 and 8. This rotation of shaft 11 causes the pin 35 to move downwardly in the inclined slot 34 toward the limit position shown in Fig. 7, and shaft 11 therefore moves to the left as viewed in Figs. 2, 6 and 7, to keep the belt 6 in alinement.

Analogously a counterclockwise movement of hand lever 25 causes shaft 11 to move in a counterclockwise direction, and causes the pin 35 to move upwardly in slot 34, urging shaft 11 toward the right as viewed in Figs. 2, 5, 6 and 7. This motion increases the effective pulley diameter and keeps the belt in alinement by the axial motion of shaft 11. If desired, a compression spring 36 can be inserted between the standard 15 and the ear 12, normally urging shaft 11 toward the left.

The resilient force for urging pulley section 17 toward pulley section 18 is effected in this instance by a centrifugal device. Thus as soon as the shaft 8 is rotated, this centrifugal device becomes active to keep the pulley sections in frictional contact with the sides of belt 6. The centrifugal mechanism is illustrated most clearly in Figs. 2 and 5. It can be housed in a cover 37 which is fixed to the right hand side of adjustable pulley section 17. Pulley section 17, as shown most clearly in Fig. 2, is provided with a hub 38 splined in keys 22. This hub has a number of radially projecting ears 39 to which are pivoted the links 40, which extend generally in a direction parallel to shaft 8. The free ends of these links are in turn pivoted to arms 41 journalled in ears 42 fixed to a disk 43. This disk 43 has a hub 44 rigidly fastened to the stationary keys 22. Arms 41 carry weights 45 which are acted upon by centrifugal force when the pulley section is rotated.

It is apparent that the weights 45 will be thrown outwardly by this centrifugal force, and will cause rotation of arms 41 to the left, as viewed in Fig. 2. This urges links 40 to the left, which in turn, urge the hub 38 and the pulley 17 to the left, that is, towards the fixed pulley section 16. It is also apparent that by proper design of the weights 45 and their supports, the leverage through which the centrifugal force acts on hub 38 can be chosen to comply with the desired requirements. Thus in the present instance, weights 45 are supported on supports inclined radially toward the right as viewed in Fig. 2, toward the axis of shaft 8; therefore, as the weights 45 fly out these supports approach a position more nearly directly radial with respect to shaft 8. As the radial position is attained the leverage is reduced to zero, since there is no further rotative force imparted to the arms 41. It is also apparent that this leverage is a maximum for that condition in which section 17 is farthest from section 16; that is, corresponding to minimum effective diameter. Accordingly, the centrifugal force is more effective for small diameter settings of the pulley structure 7, than for the larger diameters. This is desirable, because for small effective diameters, the area of contact between belt 6 and the inclined faces 18 and 19 is small, and a sufficient force should be provided to urge the sections 16 and 17 together to prevent against belt slippage. On the other hand, as weights 45 approach more nearly to a radial position, the effect of the centrifugal force is reduced. This corresponds to a larger effective diameter, where the surface of contact between belt 6 and the pulley is large, and therefore there is no material danger of belt slippage.

It is apparent that when motor 9 is at a standstill, the centrifugal device just described is ineffective. Accordingly, no centrifugal force is present tending to hold the sections 16 and 17 tightly against the belt 6. In order to make it possible to start the mechanism and to drive pulley 2 right from standstill, there is provided a device for locking the section 17 in any axial position it may happen to be when rotation ceases; and the lock is not released until after a sufficient speed is obtained to transfer the control of the adjustable section 17 to the centrifugal mechanism.

The mode in which that is accomplished is most clearly illustrated in Fig. 5. In this figure, it is seen that the keys 21 and 22 are provided with a series of ratchet teeth 46 and 47 respectively. These teeth are arranged to be engaged by spring pressed locking bars 48 and 49 respectively. These locking bars have sloping locking faces and are slidably supported in bosses 50 and 51 on the section 17. These bars 48 and 49 extend through and are guided in bushings 52 and 53 supported respectively on the outer portion of bosses 50 and 51. Compression springs 54 and 55 act upon collars 56 and 57 of these locking bars to urge them toward locking position. Furthermore, these locking bars 48 and 49 and the teeth 46 and 47 are so arranged that when one is in engagement the other one is just riding over the top of the teeth 46. In this way the locking bars are alternately effective as section 17 moves to the left. The locking bars do not interfere with the motion of section 17 toward the left, due to the particular slope of the teeth, but do prevent the separation of section 17 from section 16.

Centrifugal force can conveniently be utilized to release both locking bars 48 and 49 as soon as the shaft 8 attains speed. This can be accomplished very simply by merely providing weights 58 and 59 to the ends of the locking bars.

The mode of operation of the releasable locking means is now apparent. While shaft 8 is rotating the weights 45 are active to urge section 17 toward the left with a resilient or yielding force. As soon as rotation stops, one or the other of the locking bars 48 or 49 moves radially inwardly in response to spring pressure, and locks section 17 against motion away from section 16. Thus when motor 9 is again started from standstill, the belt 6 will not be effective upon section 17 to move it toward the right, and power can be transferred immediately from shaft 8 to shaft 3. As soon as speed is attained, weights 58, 59 fly outwardly, permitting section 17 to be held in any adjusted position by centrifugal force produced by weights 45. After the motor has attained speed it is possible, by moving hand lever 25, to adjust the speed to any desired value within the limits provided.

When the lever is moved in a clockwise direction the pulley diameter of structure 7 is reduced, because shafts 3 and 8 are moved further apart; and belt 6 wedges the pulley sections apart. Therefore the ratio of transmission is reduced. If lever 27 is moved in a counterclockwise direction the opposite effect is secured; that is, the effective diameter of pulley structure 7 is increased because shaft 8 is brought closer to shaft 3 and belt 6 is allowed to move up between sections 16, 17. The ratio of transmission, therefore, is increased. The adjustment can be maintained at any set point by the aid of segment 27.

When the lever 29 is pulled quickly toward the left, some little time may elapse before the centrifugal control is fully effective to take up belt slack; and it is in this period that the deep flanges on pulley 2 operate to prevent the belt 6 from jumping off.

I claim:
1. In a variable speed pulley structure having a pair of relatively axially adjustable sections with opposed inclined faces, forming by adjustment, variable effective pulley diameters, the combination therewith of centrifugally actuated means for exerting a force in response to rotation of the pulley structure urging the two sections toward each other, said means comprising a pivoted weight, and means whereby said force increases as the effective pulley diameter decreases.

2. In a variable speed pulley structure having a shaft, and a pair of relatively axially adjustable pulley sections on said shaft, said sections having opposed inclined faces forming by adjustment, variable effective pulley diameters, the combination therewith of means restraining axial separating movement between the sections during the period of starting the shaft rotation, comprising a resiliently urged locking bar, and centrifugal means for releasing the bar.

3. The combination as set forth in claim 2, with the addition of another resiliently urged locking bar as well as another centrifugal means for releasing the bar, and means forming two sets of teeth, respectively for the bars, the sets of teeth being offset from each other to cause one bar to engage between the teeth while the other bar is out of locking engagement.

4. In a variable speed pulley structure having a pair of relatively adjustable sections with opposed inclined faces forming by adjustment, variable effective pulley diameters, the combination therewith of yielding means for maintaining the sections against separation, and centrifugally actuated means for rendering said maintaining means ineffective.

5. In a variable speed pulley structure having a pair of relatively adjustable sections with opposed inclined faces forming by adjustment, variable effective pulley diameters, the combination therewith of one or more detents radially movable with respect to the pulley axis, for restraining relative axial movement at all speeds less than a predetermined minimum.

6. In a variable speed pulley structure having a pair of relatively adjustable sections with opposed inclined faces forming by adjustment, variable effective pulley diameters, the combination therewith of one or more radially movable detents for restraining relative axial movement of the sections, said detents being weighted and rotated with the pulley so as to cause sufficient centrifugal force to be created upon normal operation, for moving the detents to disengaging position.

7. In a variable speed pulley structure having a pair of relatively adjustable sections with opposed inclined faces forming by adjustment, variable effective pulley diameters, the combination therewith of one or more radially movable detents for restraining relative axial movement of the sections in a direction to reduce the effective diameter, and means whereby centrifugal force is created by rotation upon normal operation, for moving the detents to disengaging position.

8. In a variable speed pulley structure having a pair of relatively axially adjustable sections with opposed inclined faces forming by adjustment, variable effective pulley diameters, the combination therewith of centrifugally actuated means urging the inclined faces toward each other in response to rotation of the pulley structure, said means including a lever and link mechanism so constructed and arranged that the axial force urging the pulley sections together increases as the inclined faces separate.

9. In an adjustable speed drive mechanism, in which there are two pulley structures and a belt connecting the structures for transmitting power from one structure to the other structure, and in which one of the pulley structures has a pair of relatively axially adjustable sections resiliently urged toward each other, the sections having opposed inclined faces, forming by adjustment of the sections, variable effective pulley diameters, the combination therewith of a pivotal mounting for one of said pulley structures, on an axis parallel but spaced from the axis of the said pulley structure, a movable arm for moving the mounting, a link for transmitting movement from the movable arm to the mounting, said link having end sections respectively pivotally connected to the arm and to the mounting, as well as an intermediate section connecting the end sections and permitting relative lateral movement between said end sections, means forming a stationary shaft upon which the mounting is pivoted, and a slot and pin connection for causing axial movement of the mounting with respect to the stationary shaft upon angular movement thereof.

10. In a variable speed pulley structure having a pair of relatively adjustable sections with opposed inclined faces forming by adjustment, variable pulley diameters, the combination therewith of means for releasably locking the sections in adjusted fixed ratio driving position, and means for releasing said locking means at all speeds greater than a predetermined minimum.

11. In a variable pulley structure having a pair of relatively adjustable sections with opposed inclined faces forming by adjustment, variable effective pulley diameters, the combination therewith of centrifugally actuated means for urging the two sections toward each other in order to maintain the adjusted effective pulley diameter, and means for releasably locking the sections in adjusted fixed ratio driving position, and means for releasing said locking means at all speeds greater than a predetermined minimum.

12. In a variable speed pulley structure having a shaft, and a pair of relatively axially adjustable pulley sections on said shaft, said sections having opposed inclined faces forming by adjustment, variable effective pulley diameters, the combination therewith of centrifugally actuated means for urging the two sections toward each other in order to maintain the adjusted effective pulley diameter, and means for restraining axial separation between the sections at all speeds for which the axial force on the pulley sections created by the angular velocity of said centrifugally actuated means is less than a predetermined minimum.

13. In a variable speed pulley structure having a shaft, a source of power connected to said shaft, and a pair of relatively axially adjustable pulley sections on said shaft, said sections having opposed inclined faces forming by adjustment, variable effective pulley diameters, the combination therewith of centrifugally actuated means for urging the two sections toward each other in order to maintain the adjusted effective pulley diameter and means for restraining axial separation between the sections at all speeds for which the axial force on the pulley sections created by the angular velocity of said centrifugally actuated means is less than a predetermined minimum.

14. In a variable speed pulley structure having a shaft, and a pair of relatively axially adjustable sections on said shaft, said sections having opposed inclined faces forming by relative axial adjustment variable effective pulley diameters, the combination therewith of means restraining axial separating movement between the sections, and means actuated upon rotation of the shaft for releasing said restraining means.

15. In an adjustable speed drive mechanism, in which there are two pulley structures and a belt for transmitting power from one pulley structure to the other pulley structure, one of the pulley structures having a fixed effective diameter, the other of the pulley structures having a pair of pulley sections with opposed inclined faces, forming by relative axial adjustment variable effective pulley diameters, the combination with one of said pulley structures, of an electric motor having a shaft in driving relation to said pulley structure, means for pivotally mounting said motor and the associated pulley structure to adjust the center distance between the two pulley structures, and means for moving said pivotally mounted motor and pulley structure in an axial direction to maintain the belt alignment.

16. In an adjustable speed drive mechanism, in which there are two pulley structures and a belt for transmitting power from one structure to the other structure, and in which one of the pulley structures has a pair of pulley sections with opposed inclined belt engaging faces forming by relative axial adjustment, variable effective pulley diameters, the other of the pulley structures having a fixed effective diameter, the combination with the adjustable diameter pulley structure of means for pivotally mounting said adjustable pulley structure to vary the center distance between the two pulley structures, means for adjusting said pivotal mounting to adjust the center distance between the axes of said pulley structures, and means for adjusting the axial positions of the pulley sections of said adjustable pulley structure by substantially equal and opposite amounts with respect to the driving belt simultaneously with the pivotal movement of the adjustable pulley structure and in response to the adjustment of said center distance.

17. In a variable speed pulley structure having a pair of relatively adjustable pulley sections with opposed inclined belt engaging faces forming by adjustment, variable effective pulley diameters, the combination therewith of means exerting a resilient force in response to rotation of the pulley for urging the pulley sections toward each other, and means for restraining axial separation of the sections when the said rate of rotation becomes less than a predetermined value.

18. The structure as set forth in claim 17, with the addition of an electric motor having a shaft in coaxial driving relation to said adjustable diameter pulley structure, and in which said means for pivotally mounting said adjustable pulley structure includes means for pivotally supporting said electric motor.

19. In an adjustable speed drive mechanism, in which there are two pulley structures and a belt for transmitting power from one structure to the other structure, and in which one of the pulley structures has a pair of pulley sections with opposed inclined belt engaging faces forming by relative axial adjustment variable effective pulley diameters, the other of the pulley structures having a fixed effective diameter, the combination with one of said pulley structures of means for pivotally mounting said pulley structure to vary the center distance between the two pulley structures, means for adjusting the axial positions of the pulley sections of said adjustable pulley structure by substantially equal and opposite amounts with respect to the position of the driving belt on the fixed diameter pulley structure simultaneously with the pivotal movement of said pivotally mounted pulley structure, and resilient means for urging said pulley sections into driving relation with said belt.

20. The structure as set forth in claim 19, with the addition of an electric motor having a shaft in coaxial driving relation to said pivotally mounted pulley structure, and in which said means for pivotally mounting said pulley structure includes means for pivotally supporting said motor.

21. In an adjustable speed drive, in which there are two pulley structures and a belt for transmitting power from one structure to the other, and in which one pulley structure has a pair of pulley sections with opposed inclined belt engaging faces forming by relative axial adjustment variable effective pulley diameters, the other of the pulley structures having a fixed effective diameter the combination with the adjustable pulley structure of an electric motor having a shaft in coaxial driving relation to said adjustable pulley structures, means for pivotally mounting said electric motor and the pulley structure driven thereby to vary the center distance between the two pulley structures, means for adjusting the axial positions of the pulley sections of said adjustable pulley structure by substantially equal and opposite amounts with respect to the driving belt simultaneously with the pivotal movement of the adjustable pulley structure, and resilient means for urging said pulley sections into driving relation with said belt.

22. In a variable speed transmission, the combination of: a motor including a drive shaft; pivotal supporting means adapted to support said motor so that it may be rotated about an axis parallel to said drive shaft; a driven shaft; a pair of pulleys, one of said pulleys being of the variable-diameter V-type, one of said pulleys being associated with said drive shaft and the other of said pulleys being associated with said driven shaft; a belt connecting said pulleys; and adjustment means adapted to change the effective diameter of said variable-diameter pulley and simultaneously move said drive shaft axially to maintain said pulleys in alignment, said motor rotating about said axis as said adjustment means is actuated.

23. In a variable speed transmission, the combination of: a motor including a drive shaft; pivotal supporting means adapted to support said motor so that it may be rotated about an axis parallel to said drive shaft; a driven shaft; a pair of pulleys, one of said pulleys being of the variable-diameter V-type, one of said pulleys being associated with said drive shaft and the other of said pulleys being associated with said driven shaft; a belt connecting said pulleys; means for rotating said motor about said axis; and means for moving said drive shaft axially simultaneously with the rotation of said motor about said axis.

24. In a variable speed transmission, the combination of: a motor including a drive shaft; a supporting shaft adapted to pivotally support said motor so that it may be rotated about said supporting shaft on an axis parallel to said drive shaft; a driven shaft; a variable-diameter V-type pulley on said drive shaft; a pulley on said driven shaft; a belt connecting said pulleys; means for moving said drive shaft axially; and means for rotating said motor about said axis as said drive shaft is moved axially.

25. In a variable speed transmission, the combination of: a motor including a drive shaft; a supporting shaft adapted to pivotally support said motor so that it may be rotated about said supporting shaft on an axis parallel to said drive shaft; a driven shaft; a variable-diameter V-type pulley on said drive shaft; a pulley on said driven shaft; a belt connecting said pulleys; and adjustment means adapted to change the effective diameter of said variable-diameter pulley and simultaneously move said drive shaft axially to maintain said pulleys in alignment, said motor rotating about said axis as said adjustment means is actuated.

26. In a variable speed transmission, the combination of: a motor including a drive shaft; a variable-diameter V-type pulley on said drive shaft adapted to receive a belt; a rotatable bar adapted to swingably support said motor, said bar being axially movable to move said drive shaft axially; means for varying the diameter of said pulley, said means being associated with said bar; and control means for moving said bar axially and simultaneously rotating it to move said drive shaft axially and simultaneously vary the diameter of said pulley.

DON HEYER.